United States Patent
Liu et al.

(10) Patent No.: US 8,849,672 B2
(45) Date of Patent: Sep. 30, 2014

(54) SYSTEM AND METHOD FOR EXCERPT CREATION BY DESIGNATING A TEXT SEGMENT USING SPEECH

(75) Inventors: Huanglingzi Liu, Beijing (CN); Yue Zhong Tang, Beijing (CN); Yu Zhang, Beijing (CN)

(73) Assignee: Core Wireless Licensing S.a.r.l., Luxembourg (LU)

( * ) Notice: Subject to any disclaimer, the term of this patent is extended or adjusted under 35 U.S.C. 154(b) by 1144 days.

(21) Appl. No.: 12/125,377

(22) Filed: May 22, 2008

(65) Prior Publication Data

US 2009/0292540 A1  Nov. 26, 2009

(51) Int. Cl.
*G10L 21/00* (2013.01)
*G10L 25/00* (2013.01)
*G10L 15/00* (2013.01)
*G10L 15/22* (2006.01)

(52) U.S. Cl.
CPC ....................................... *G10L 15/22* (2013.01)
USPC ............................ 704/275; 704/270; 704/231

(58) Field of Classification Search
None
See application file for complete search history.

(56) References Cited

U.S. PATENT DOCUMENTS

| | | | | |
|---|---|---|---|---|
| 5,377,303 A * | 12/1994 | Firman | ......................... | 704/275 |
| 5,632,002 A * | 5/1997 | Hashimoto et al. | ........... | 704/231 |
| 6,233,559 B1 * | 5/2001 | Balakrishnan | ................ | 704/275 |
| 6,442,523 B1 * | 8/2002 | Siegel | ............................ | 704/270 |
| 6,601,027 B1 | 7/2003 | Wright | | |
| 6,636,831 B1 * | 10/2003 | Profit et al. | .................... | 704/275 |
| 6,643,641 B1 * | 11/2003 | Snyder | .......................... | 707/709 |
| 2003/0182124 A1 | 9/2003 | Khan | | |
| 2005/0021336 A1 * | 1/2005 | Katsuranis | ..................... | 704/246 |
| 2005/0273487 A1 * | 12/2005 | Mayblum et al. | ............. | 709/202 |
| 2007/0055659 A1 * | 3/2007 | Olschafskie et al. | ............. | 707/4 |
| 2007/0233482 A1 | 10/2007 | Lee | | |
| 2008/0300886 A1 * | 12/2008 | Patch | ............................ | 704/275 |

FOREIGN PATENT DOCUMENTS

EP  0 773 532 A2  5/1997

OTHER PUBLICATIONS

International Search Report Dated Sep. 29, 2009.

* cited by examiner

*Primary Examiner* — Jesse Pullias
(74) *Attorney, Agent, or Firm* — Ziegler IP Law Group

(57) ABSTRACT

A method including displaying content on a display of a device, receiving a speech input designating a segment of the content to be excerpted and transferring the excerpted content to a predetermined location for storage and retrieval.

24 Claims, 15 Drawing Sheets

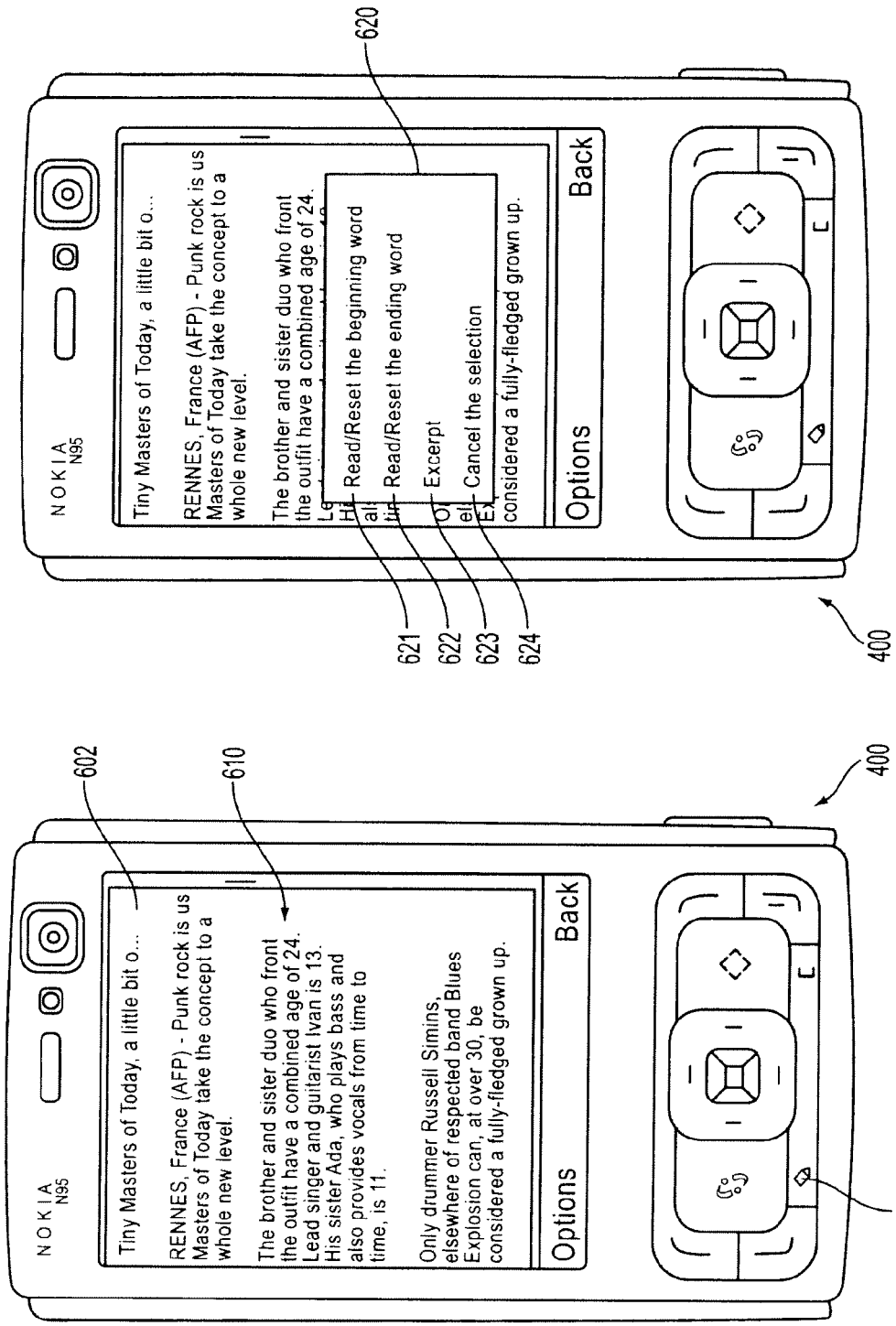

SYSTEM AND METHOD FOR EXCERPT CREATION BY DESIGNATING A TEXT SEGMENT USING SPEECH

BACKGROUND

1. Field

The disclosed embodiments generally relate to user interfaces and, more particularly to user interfaces for managing and accessing data.

2. Brief Description of Related Developments

Generally personal content management tools enable people to organize, subscribe, publish and find information that resides on local systems and remote servers. These management tools are generally applied to devices with large screens with limited applications in devices with small screens and limited computing capabilities such as for example mobile communication devices. For example, devices with small screens generally only allow a user to view one page or a portion of a page of content at a time. Most mobile communication devices generally do not support viewing multiple windows where each window includes content from different documents or sources. Selecting and editing information, such as that found in web pages in a mobile devices generally is difficult as the mobile device include a limited key pad, typically a 12 key input. Some mobile devices include other inputs such as a stylus for use on a touch screen, however, the user generally has to multitask between several applications to take content from one application and insert that content into another application such as copying and pasting content from a web page to a notepad application.

Some web notebook applications allow web surfers to clip and collect information from, for example, web pages to an online notebook application while linking the clipped content back to its source (e.g. the web page). However, these applications generally do not provide their full functionality on mobile devices. For example, the mobile version of the web notebooks generally only allows a user to write notes that are transferred to the web notebook. However, these notes are stand alone notes that are manually entered and are not excerpted from, for example, a web page or other document.

It would be advantageous to be able to easily excerpt content from documents in a mobile device. It would also be advantageous to easily view the source of the excerpted content.

SUMMARY

The aspects of the disclosed embodiments are directed to a method including displaying content on a display of a device, receiving a speech input designating a segment of the content to be excerpted and transferring the excerpted content to a predetermined location for storage and retrieval.

Another aspect of the disclosed embodiments is directed to a computer program product stored in a memory. The computer program product includes computer readable program code embodied in a computer readable medium for displaying content on a display of a device, receiving a speech input designating a segment of the content to be excerpted and transferring the excerpted content to a predetermined location for storage and retrieval.

Other aspects of the disclosed embodiments are directed to a system including remote server and a portable communication device including a display configured to present predetermined content and a processor configured to request the predetermined content from the remote server, recognize a speech input for designating a segment of the content to be excerpted and transfer the excerpted content to a predetermined location for storage and retrieval.

Still other aspects of the disclosed embodiments are directed to an apparatus and a user interface including at least one input device configured to receive a speech input, a display configured to present predetermined content acquired by the apparatus and a processor configured to recognize the speech input for designating a segment of the content to be excerpted and transfer the excerpted content to a predetermined location for storage and retrieval.

BRIEF DESCRIPTION OF THE DRAWINGS

The foregoing aspects and other features of the embodiments are explained in the following description, taken in connection with the accompanying drawings, wherein:

FIGS. 6A-6I illustrate exemplary screen shots in accordance with aspects of the disclosed embodiments;

DETAILED DESCRIPTION OF THE EMBODIMENT(s)

Figure 1:
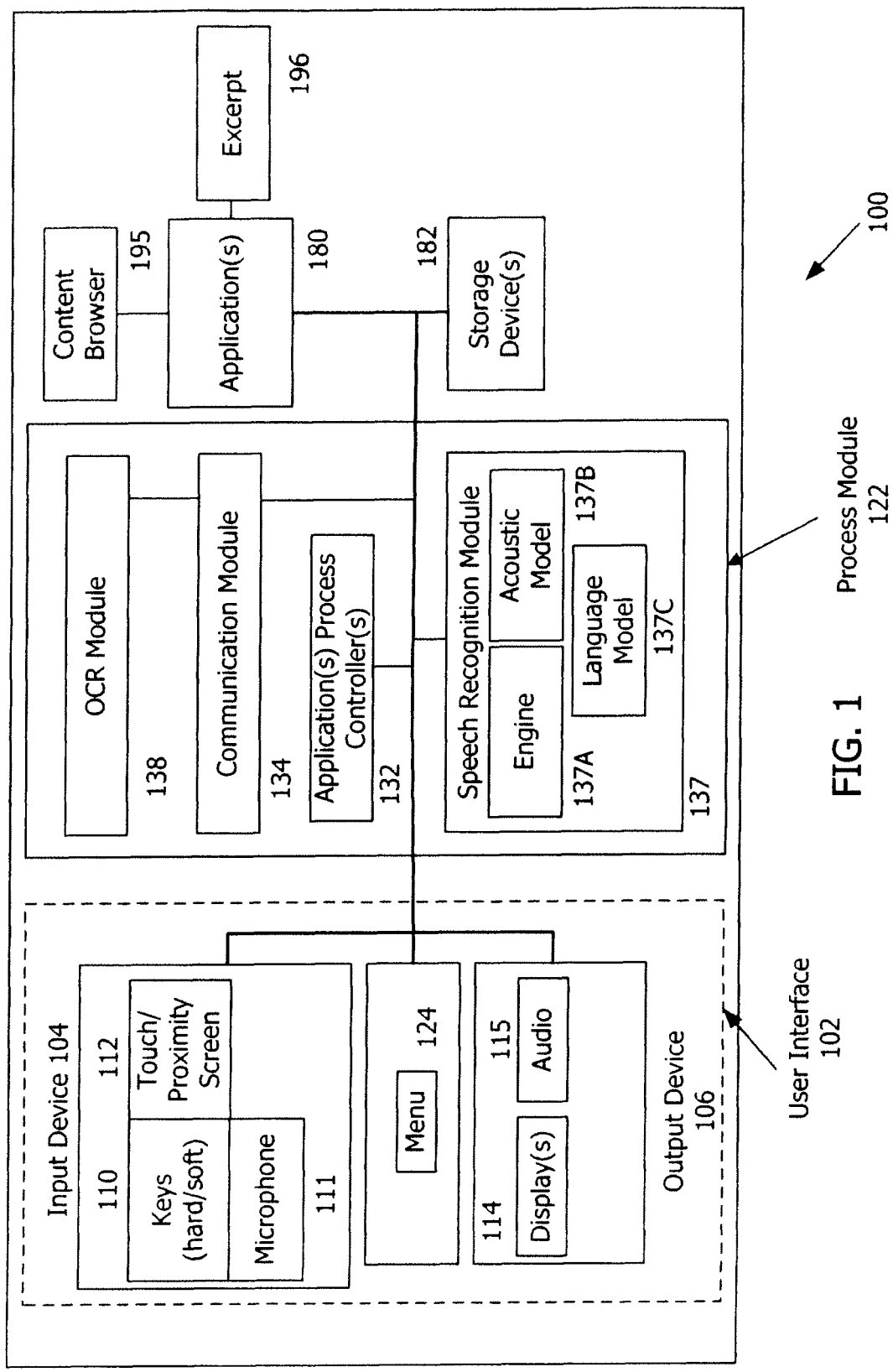
FIG. 1 shows a block diagram of a system in which aspects of the disclosed embodiments may be applied.

FIG. 1 illustrates one embodiment of a system 100 in which aspects of the disclosed embodiments can be applied. Although the disclosed embodiments will be described with reference to the embodiments shown in the drawings and described below, it should be understood that these could be embodied in many alternate forms. In addition, any suitable size, shape or type of elements or materials could be used.

Figure 2A:
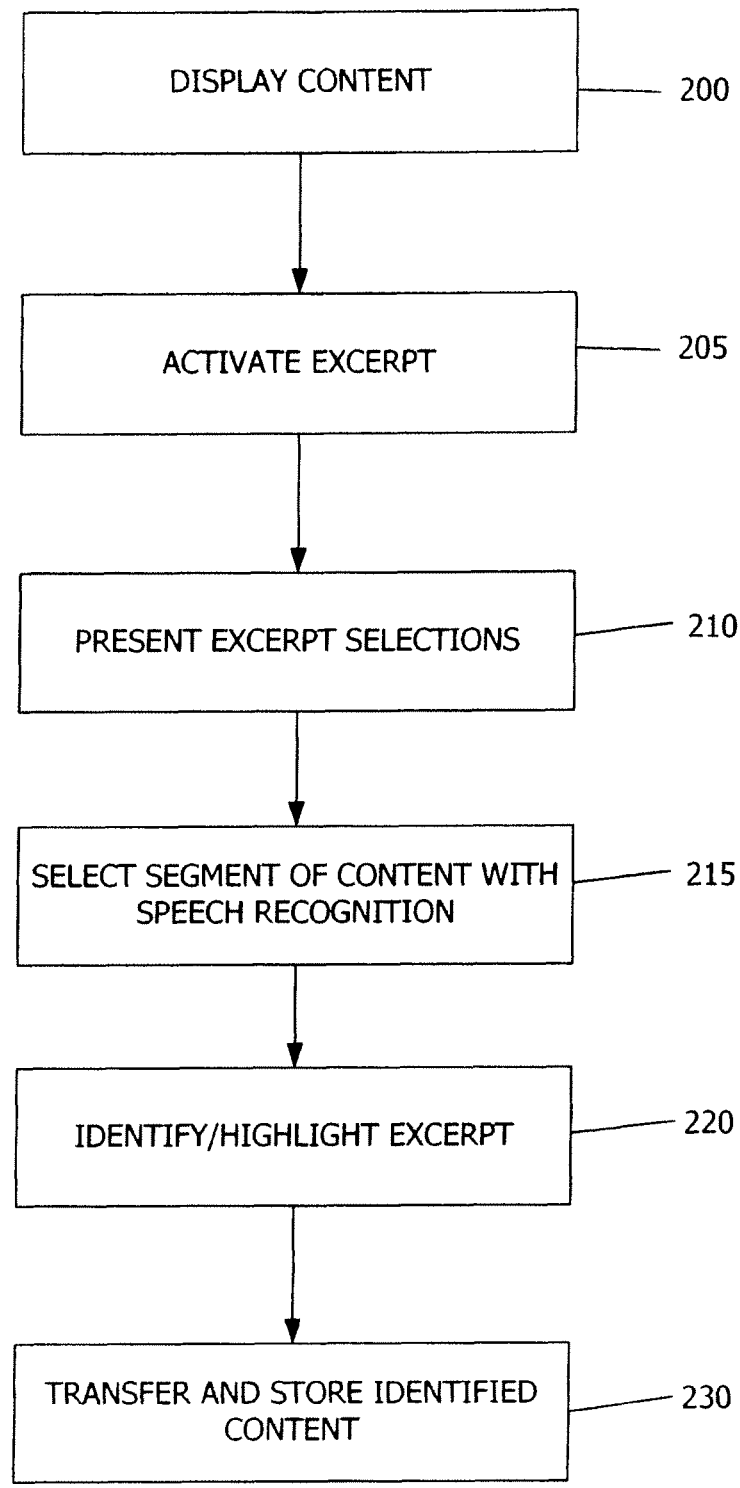
FIGS. 2A and 2B illustrate a flow diagrams according to aspects of the disclosed embodiments.

Aspects of the disclosed embodiments allow a user of a mobile device or system, such as system 100, to easily excerpt content from any suitable document, place that excerpted content in a predetermined application, and maintain the link between the excerpted content and its source. Aspects of the disclosed embodiments provide a solution for conveniently making excerpts in a mobile device from mobile content by excerpting selected content. The content can be selected by speaking words included in the content where the words identify the content that is selected. For example, referring to FIG. 2A, content is presented on, for example, display 114 of the system 100 (FIG. 2A, Block 200). The term "content" as used herein generally refers to words, pictures, images, symbols, characters or any other suitable items that are presented on a display. It is noted that while the aspects of the disclosed embodiments are described herein with respect to web browsers and web pages the aspects of the disclosed embodiments are not limited thereto. As non-limiting examples, aspects of the disclosed embodiments can be applied to any suitable documents including, but not limited to, electronic books, word processing documents, photographs and images. An excerpt application 196 of the system (FIG. 2A, Block 205) is activated. The system 100 may present any suitable selections or options for selecting content to be excerpted (FIG. 2A, Block 210), as will be described in greater detail below. One aspect of the disclosed embodiments provides for selecting the excerpted content through a speech recognition function or module 137 of the system (FIG. 2A, Block 215), although the aspects of the disclosed embodiments are not limited to selection by speech recognition. In other examples, any suitable input method can be used for selecting the excerpted content including, but not limited to, keys 110, touch/proximity screen 112 of the system and the speech recognition or any combination thereof.

Figure 3:
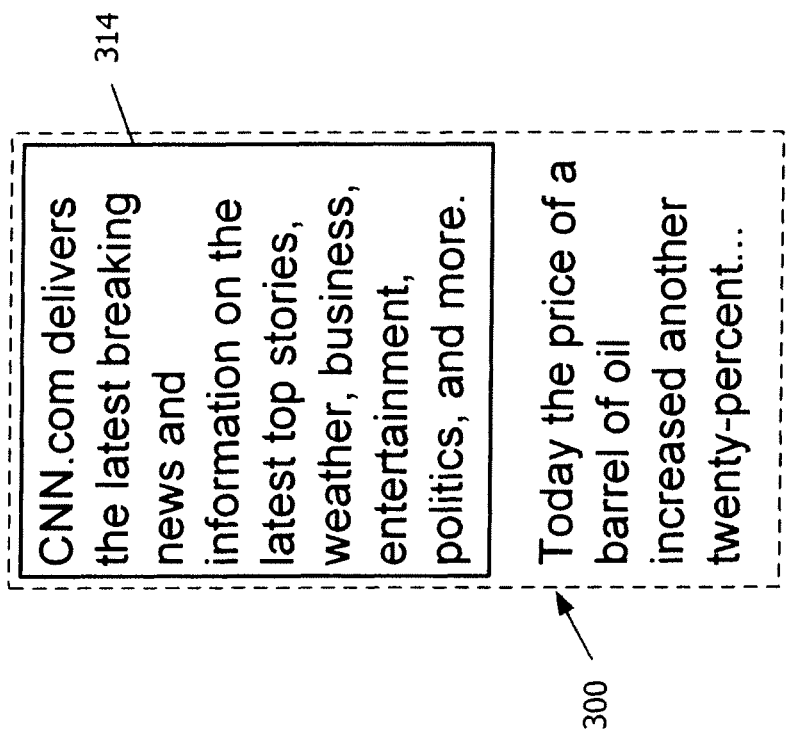
FIG. 3 illustrates displaying content with the system of FIG. 1 according to aspects of the disclosed embodiments.

In one embodiment, the speech recognition module 137 includes a recognition engine 137A, an acoustic model 137B and a language model 137C. The features of the speech recognition module 137 are described herein for exemplary purposes only and are not intended to limit the speech recognition module features. For example, the speech recognition module may also include any other suitable features and is not limited to those described herein. The language model 137C is flexible and may facilitate improving or maximizing the recognition accuracy of the speech recognition module 137. The language model 137C may be configured to collect and organize vocabulary words that may be spoken by the user to, for example, select the excerpted content in any suitable manner. In one aspect of the disclosed embodiments the vocabulary words are limited to the words, characters and/or symbols presented on the display 114. For example, FIG. 3 shows content from an exemplary web page 300, as indicated by the dashed line. The area 314 represents the viewable area of the display such that the words included in the vocabulary are only those that are visible in the display area 314. As the display changes (e.g. the content is scrolled up/down/left/right) the vocabulary is updated to include newly visible content while the content that is no longer visible in the display area 314 is removed from the vocabulary. In alternate embodiments the words that were added to the vocabulary while being presented on the display may remain in the vocabulary even though they are scrolled off of or otherwise removed from the display. In other examples, the vocabulary words may include the words, characters and/or symbols (collectively referred to herein as words) that are not visible or were not previously presented on the display 114 but are included in the document being viewed. Generally, a smaller vocabulary set will optimize the performance of the speech recognition module 137. The vocabulary words can be organized by the language model 137C in any suitable manner including, but not limited to, by isolating words, grammar rules and statistical models.

Figure 2B:
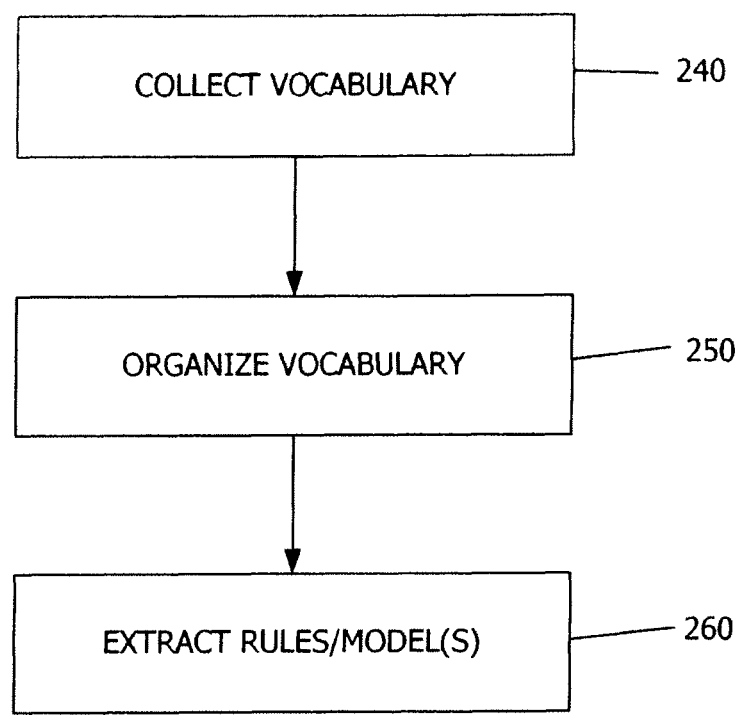

Referring also to FIG. 2B, when the excerpt application 196 is activated the language model 137C may collect the vocabulary set in any suitable manner (FIG. 2B, Block 240). In one aspect of the disclosed embodiments, the vocabulary set is created by collecting and storing items presented on the display 114 as described above. For example, the language model 137C may be configured to recognize only the words shown on the display so as to limit the size of the vocabulary set so that performance of the speech recognition module 137 is maximized. Where for example, a content browser 195 is active such that the items or content on the display includes words that are computer recognizable, information pertaining to the content, including texts, links and pictures, can be obtained by the language model 137C through the content browser 195. Where the individual items presented on the display are not computer readable, such as in an image, text based content of the image can be recognized through, for example, optical character recognition (OCR). In this aspect the speech recognition module 137 may work in conjunction with OCR module 138 for creating the vocabulary. The words in the vocabulary are organized by the language model 137C (FIG. 2B, Block 250). For example, grammar rules or statistical models can be extracted from the content presented on the display 114. In one aspect, general rules or models can be created from a larger training corpus so that the speech recognition relating to the content presented on the display can be trained in a minimized amount of time. In another aspect, the related words and corresponding weights in the model or rules can be adjusted according to the content presented on the screen to, for example, maximize the speech recognition accuracy. In other examples, the words in the vocabulary can be organized in any suitable manner with any suitable rules or models.

Figure 4:
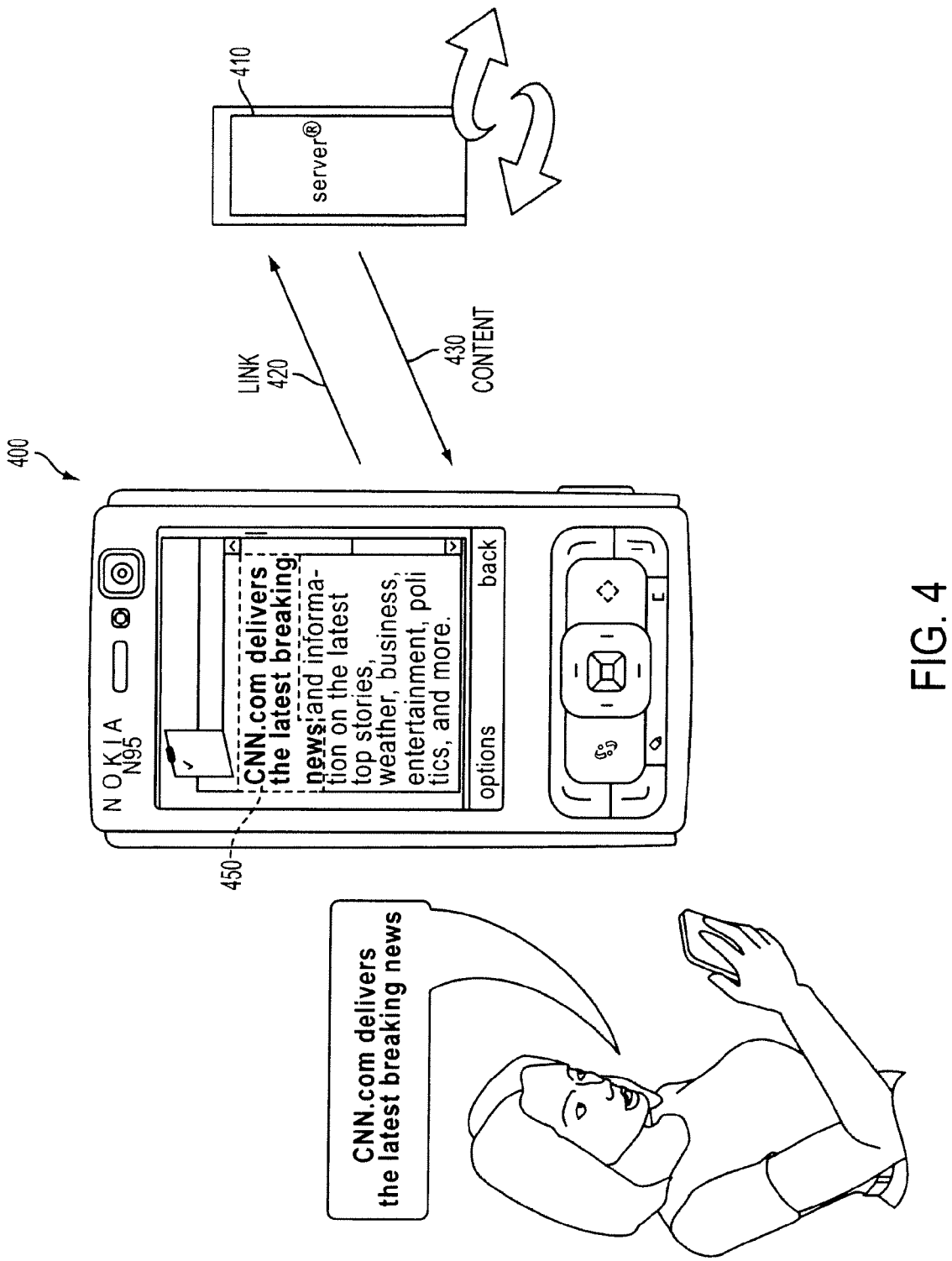
FIGS. 4 and 5 illustrate exemplary systems in which aspects of the disclosed embodiments may be applied.
Figure 5:
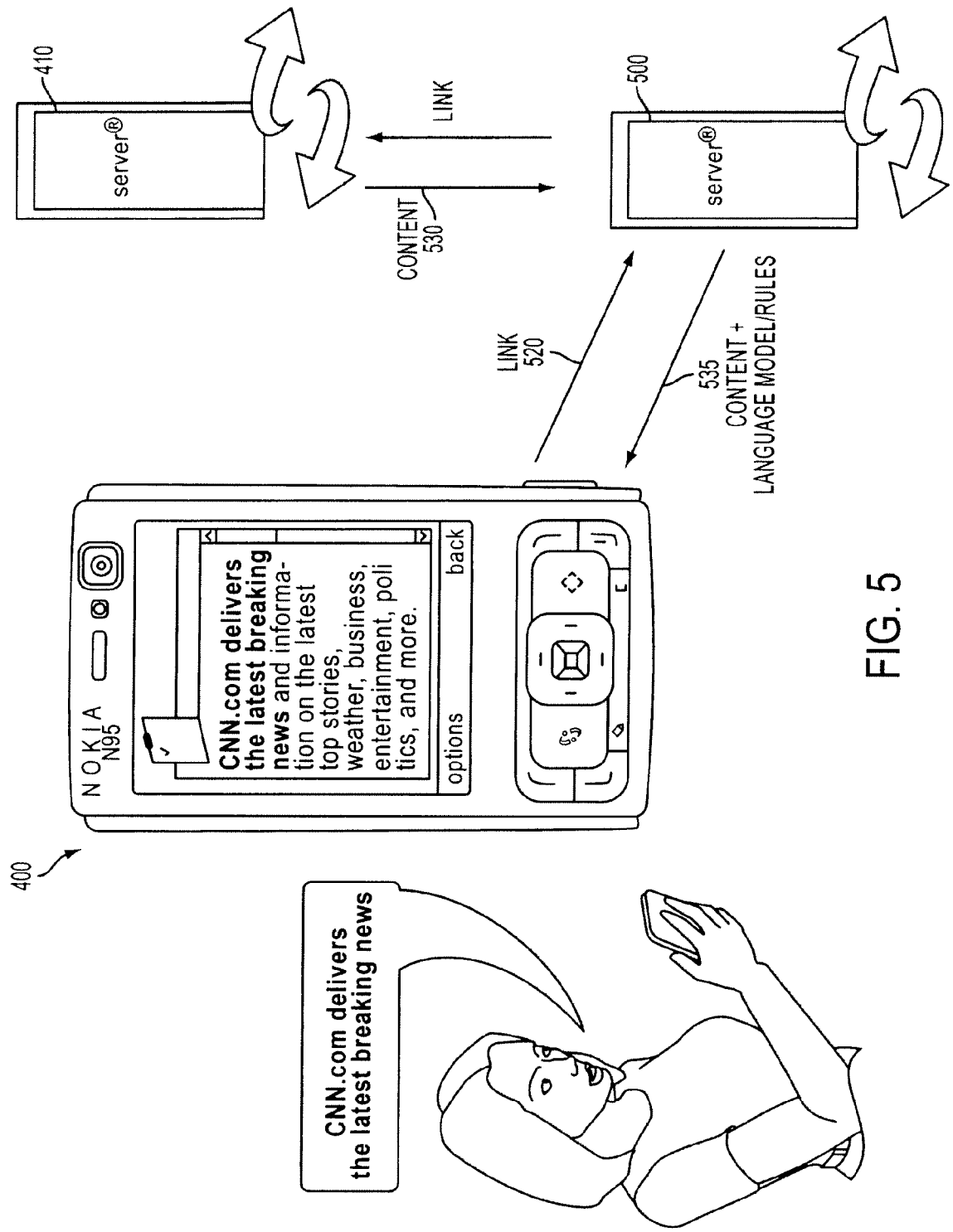

Extraction of the grammar rules and/or statistical models can be performed by the system 100 or external to the system 100 (FIG. 2B, Block 260). In one example, as can be seen in FIG. 4, where the extraction is performed by the system 100 (illustrated in the Figure as mobile device 400), the device 400 transmits a link or request 420 for a predetermined document or content, which in this example is a web page, to a server 410. The server sends the content 430 of the document in response to the request where the processor 132 of the device 400 analyzes the content 430, extracts the rules and/or models and creates the vocabulary. In another example, referring to FIG. 5, where the extraction is performed external to the system 100, the device 400 may send a link 520 to, for example, a proxy server 500. The proxy server may forward the link 520 to server 410, which in turn sends the requested content 530 to the proxy server 500. The proxy server 500 is configured to extract the rules and/or models from the content 530. The proxy server 500 sends the content including the rules and/or models 535 to the device 400. In one aspect the extracted rules and/or models can be embedded in the content so that their transmission into the device 400 is transparent to the user while allowing the rules and models to be accepted by the speech recognition module 137.

The system 100 may identify the desired content based on the user selection and indicate the selection to the user in any suitable manner such as visually or audibly (FIG. 2A, Block 220). As can be seen in FIG. 4, identified content 450 is shown in bold print but in alternate embodiments the identified content can be indicated in any suitable manner including, but not limited to, highlighting, changing font type and/or color and underlining. When the user finishes identifying content to be excerpted, the system may present to the user selections for excerpting the identified content to any suitable application and storing the identified content in any suitable location (FIG. 2A, Block 230).

Figure 6D:
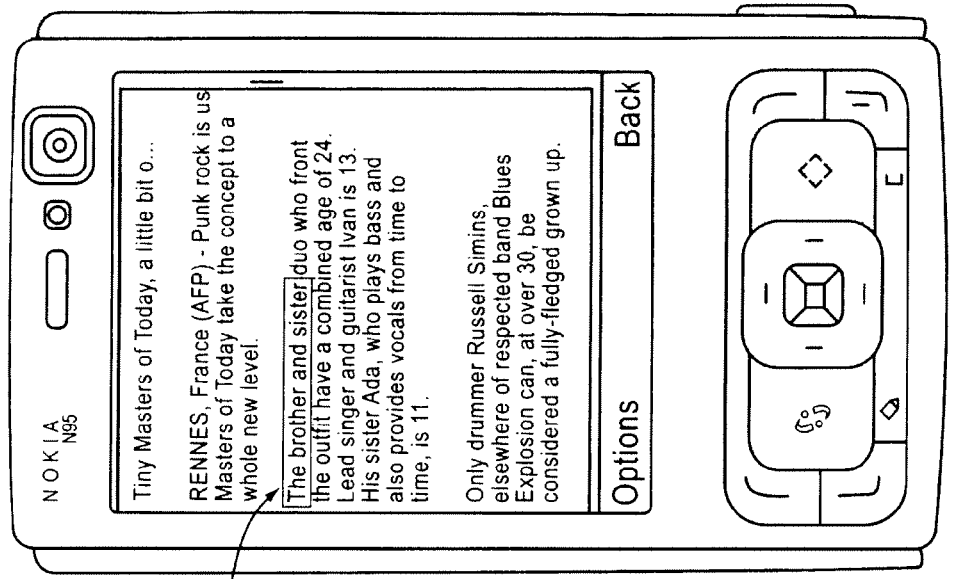

Referring now to FIGS. 6A-6I, an example of content excerption will be described in greater detail. Again, the system 100 is represented in FIGS. 6A-6I as mobile device 400 for exemplary purposes only. As can be seen in FIG. 6A, a web page 610 is acquired and displayed on a display 602 of the device 400. In this example, the excerpt application 196 may be activated by depressing or otherwise activating, key 600 of the device. The key 600 may be any suitable key including, but not limited to, a dedicated key or an assignable key. In alternate embodiments the excerpt application 196 can be activated in any suitable manner. The excerpt application 196 may cause excerpt selections 621-624 to be displayed on the display 602. In this example, the selections 621-624 are displayed in a pop-up menu or window 620 but in alternate embodiments the selections may be presented in any suitable manner. As can be seen in FIG. 6B the selections allow the user to "read/reset the beginning word" 621, "read/reset the ending word" 622, "excerpt" 623 and "cancel the selection" 624. These selections 621-624 are only exemplary in nature and it should be understood that the selections may include any suitable selections.

Figure 6C:
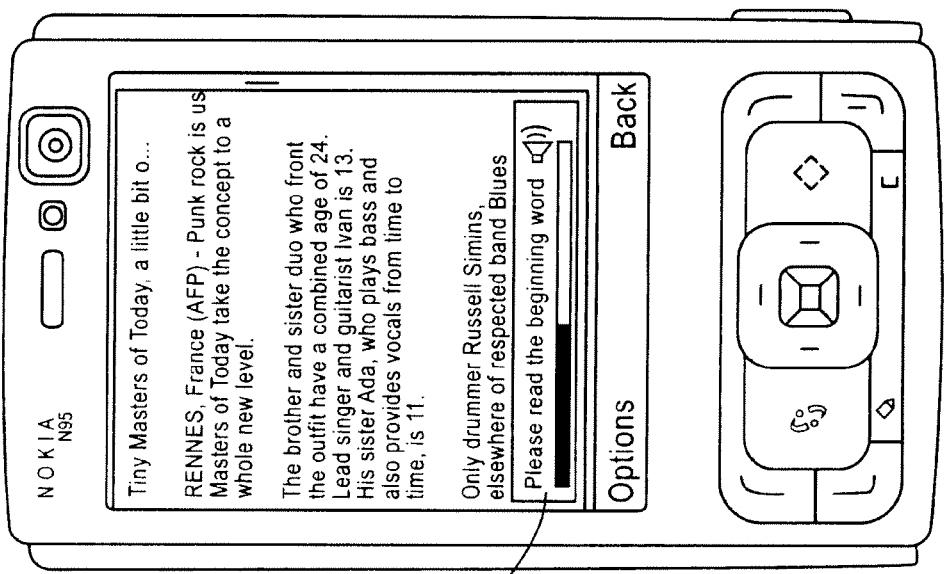

In one aspect of the disclosed embodiments, to identify content to be excerpted the beginning word in the excerption is selected by the user through, for example, selection 621. In one embodiment, the device 400 may prompt 630 the user to speak the word(s) at the beginning of the content to be excerpted as shown in FIG. 6C. In alternate embodiments, the prompt may be an audible prompt or a combination of a visual and audible prompt. In other alternate embodiments other input methods, as described above, may be used for selecting the excerpted content. The speech recognition module 137 recognizes the spoken words and identifies those words within the displayed content. In this example, the beginning words 635 "The brother and sister" are spoken. The device 400 recognizes the beginning words 635 and identifies them by highlighting those words on the display 602 as shown in FIG. 6D. The ending words of the content to be excerpted are selected through, for example, selection 622. The device 400 prompts the user to speak the ending words in a manner substantially similar to that described above with respect to FIG. 6C. In this example, the ending words may be "from time to time, is 11". The device recognizes the ending words and identifies those words in the displayed content. In other aspects the predetermined commands may be used to select portions of the displayed content. For example, the excerpt application may include commands such as, "first line", "first paragraph", "whole screen", "next page", "current page", "last line", "reset the beginning word", "reset the ending word" or any other suitable commands for identifying one or more portions of the displayed content for excerption.

Figures 6E, 6F:
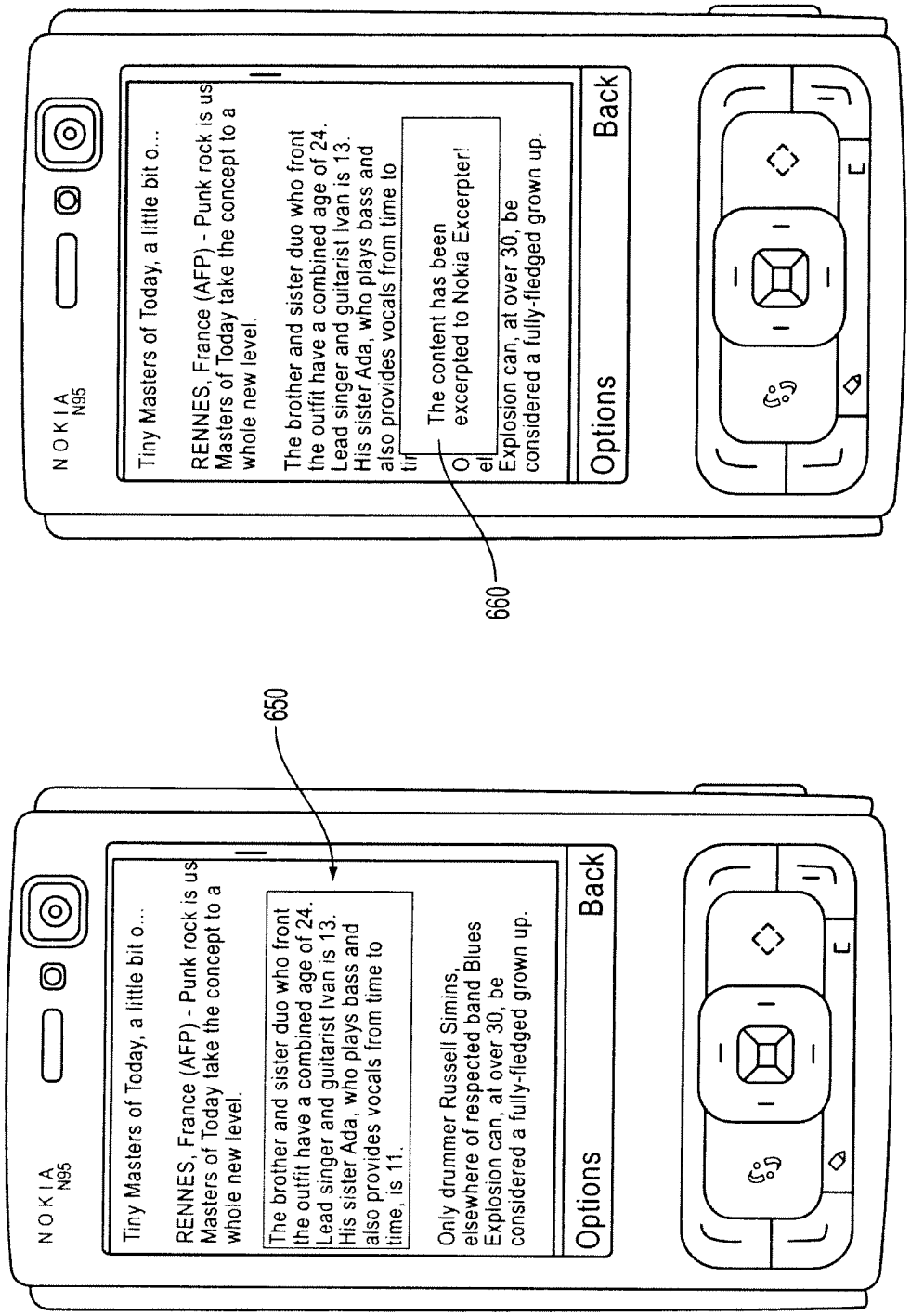

In one embodiment, as shown in FIG. 6E, after the ending words are identified the device highlights the content to be excerpted 650. In other embodiments the device may highlight the ending words in manner substantially similar to that described above with respect to the beginning words 635. The content to be excerpted can be excerpted through, for example, selection 623. When the content is excerpted the device may indicate 660 in any suitable manner that the content has been excerpted as shown in, for example, the pop-up window of FIG. 6F. The indication 660 may include the location where the excerpted content is sent which, for exemplary purposes only, in this example is the Nokia Excerpter but in alternate embodiments may be any suitable location or application. In other embodiments, the excerpt application 196 may include any suitable commands or selections for selecting the content to be excerpted. As non-limiting examples, the commands or selections can provide for selecting a predetermined line of the displayed content, all of the content presented on the display, a predetermined paragraph of the displayed content, a predetermined page of the displayed content and/or any other suitable commands or selections for selecting a predetermined portion of displayed content. In alternate embodiments the commands or selections may provide for selecting content that is not displayed on the display 114. For example, where a predetermined page is specified, all of the page's content can be selected without building a vocabulary for the entire page. Where the user specified an incorrect portion of the content to be excerpted or decides to expand or contract the amount of excerpted content the user can, for example, through selections 621, 622, 624 reset the beginning or ending word to redefine the selected content or cancel the selection.

Figure 6H:
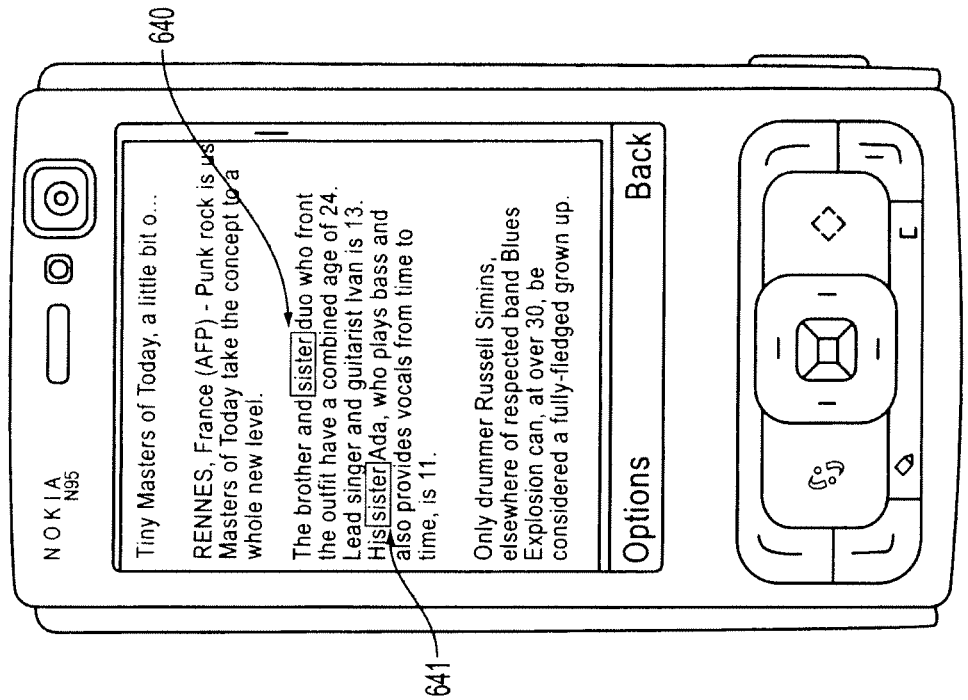
Figure 6G:
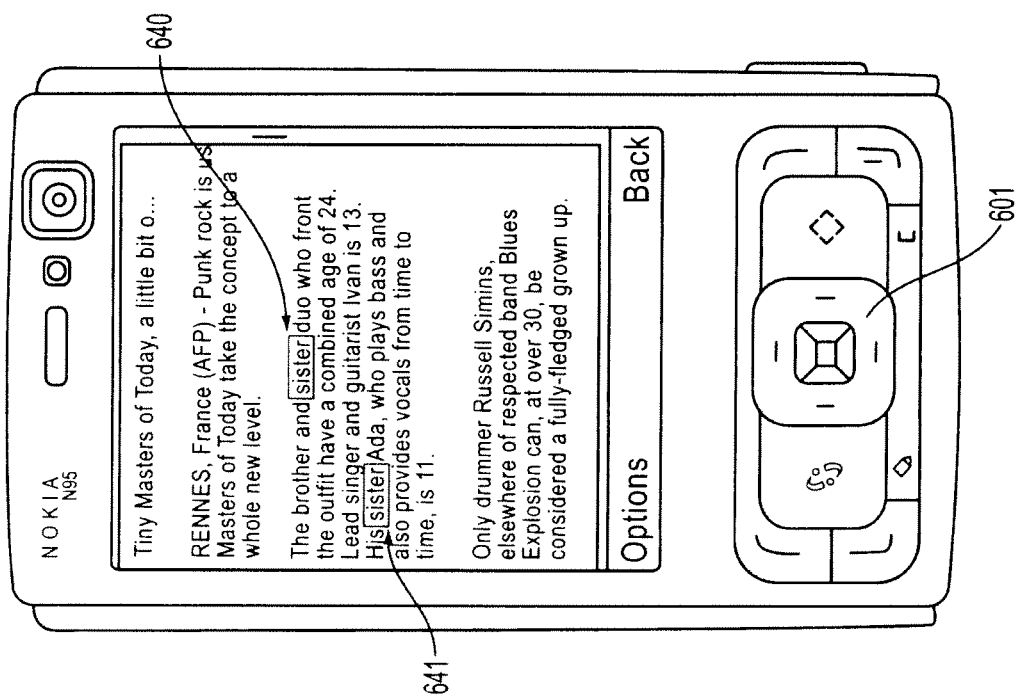

Referring to FIGS. 6G and 6H, where a word that is spoken when selecting, for example, the beginning or ending word of the excerption, is repeated in the displayed content the device is configured to allow the user to designate an instance of the word to be selected. For example, if the word "sister" is spoken the device 400 recognizes and identifies the word "sister" in two locations 640, 641 on the display. The device 400 may prompt the user for designating which location of the word is to be used for determining the content to be excerpted. In one example, the user may audibly identify which instance of the word to use. In other examples, a key of the device may be activated, such as navigation key 601, to toggle between the instances of the spoken word. In still other examples, the desired instance of the word can be selecting with a pointing device through a touch enable screen of the device 400. In alternate embodiments the desired instance of a word can be designated in any suitable manner and the aspects of the disclosed embodiments are not limited to those examples described above. As can be seen in FIGS. 6G and 6H the designated instance of the word may be highlighted in any suitable manner, such as those described above with respect to FIG. 4, so that the selected instance of the word is easily identifiable. In this example, the designated instance of the word "sister" is highlighted by forming a box around the selected instance of the word.

Figure 6I:
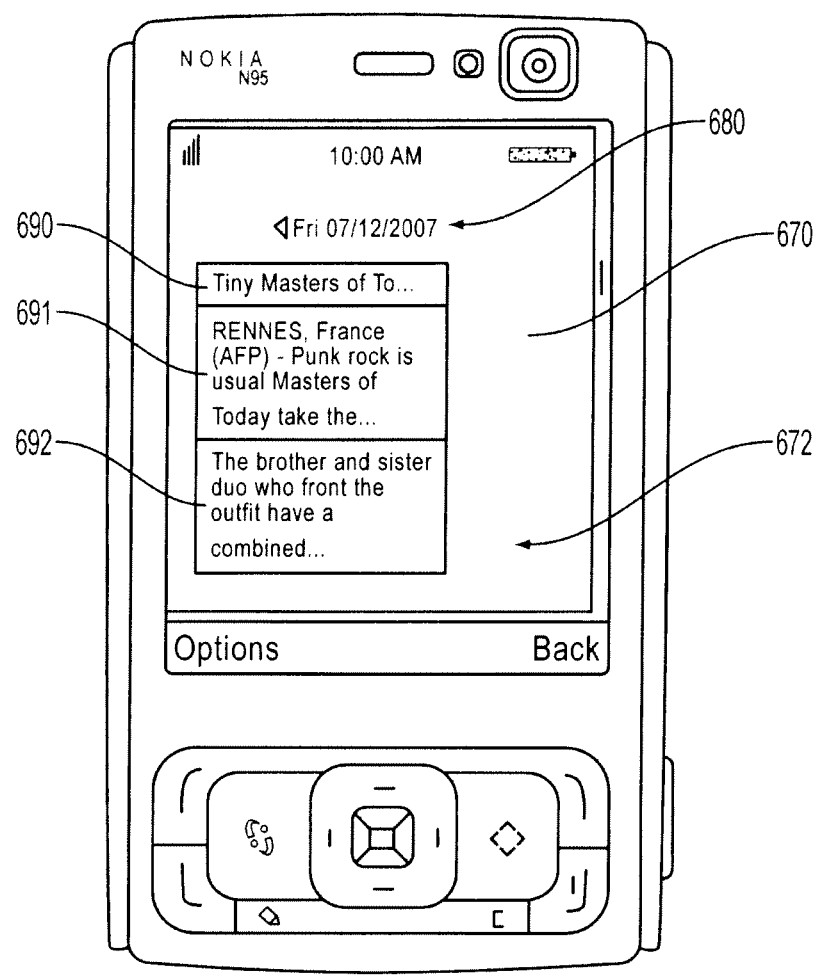

FIG. 6I illustrates an exemplary excerpt organizer 672 corresponding to a location where the excerpts are sent. The contents and format of the excerpt display screen 670 are for exemplary purposes only and in alternate embodiments the excerpt display screen 670 may include any suitable information presented in any suitable manner. Here the excerpt display screen 670 includes a date 680 corresponding to a date on which the excerpts are made such that the excerpts can be chronologically organized and/or searched. In alternate embodiments, the excerpt organizer 672 may include an organization menu for categorizing the excerpts. In another aspect the system 100 may be configured to prompt a user to specify a category, topic, or keyword for identifying the excerpt in the excerpt organizer 672, otherwise a default category may be designated by the system 100. The default category may be a user defined category or one that is designated by the excerpt organizer 672/excerpt application 196. In other alternate embodiments, the excerpt display screen 670 may include a search feature that allows a user to search the excerpts by, for example, a word included in the excerpt, date, topic, category or any other suitable search criteria. In this example, the excerpt display screen 670 includes a link 690 to the document from which the excerptions were made. As non-limiting examples, the link 690 may represent the title of the document, a file name of the document, a title of a web page, a web address or any other suitable identifying information that when selected automatically directs the user back to the original document. In other examples, the system 100 may present selections to the user when the link 690 is selected so that the source content provided by the link is not presented upon, for example, an accidental selection of the link 690. One or more excerpts 691, 692 corresponding to the link 690 may be displayed along with the link. The excerpts can be viewed by, for example, selecting a desired excerpt in any suitable manner, such as those described above with respect to selecting the excerpted content, so that the entirety of the excerpt is presented to the user through the display 602. The excerpts can be stored in the device 400 or in any suitable memory external to the device for retrieval at any suitable time. In one example, the excerpts may be stored in a central location, such as a network server, so they are accessible by the device 400 and other devices such as other mobile or non-mobile devices.

Referring again to FIG. 1, the system 100 of the disclosed embodiments can include input device 104, output device 106, process module 122, applications module 180, and storage/memory 182. The components described herein are merely exemplary and are not intended to encompass all components that can be included in the system 100. The device 100 can also include one or more processors to execute the processes, methods and instructions described herein. The processors can be stored in the device 100, or in alternate embodiments, remotely from the device 100.

The input device 104 is generally configured to allow a user to input data and commands to the system or device 100. The input device 104 may include any suitable input features including, but not limited to hard and/or soft keys 110 and touch/proximity screen 112. The output device 106 is configured to allow information and data to be presented to the user via the user interface 102 of the device 100. The process module 122 is generally configured to execute the processes and methods of the disclosed embodiments. The application process controller 132 can be configured to interface with the applications module 180 and execute applications processes with respect to the other modules of the system 100. The communication module 134 may be configured to allow the device to receive and send communications, messages and data (collectively referred to herein as communications), such as, for example, one or more of voice calls, text messages, chat messages, email and data received from the Internet. The communications module 134 is also configured to receive communications from other devices and systems.

The applications module 180 can include any one of a variety of applications or programs that may be installed, configured or accessible by the device 100. In one embodiment the applications module 180 can include excerpt application 199, web or content browser 195, office, business, media player and multimedia applications. The applications or programs can be stored directly in the applications module 180 or accessible by the applications module. For example, in one embodiment, an application or program such as the excerpt application 196 may be network based, and the applications module 180 includes the instructions and protocols to access the program/application and render the appropriate user interface and controls to the user.

In one embodiment, the system 100 comprises a mobile communication device. The mobile communication device can be Internet enabled. The input device 104 can also include a camera or such other image capturing system 720 (See FIG. 7A). In one aspect the imaging system 720 may be used to image any suitable text. The image of the text may be converted into, for example, an editable document (e.g. word processor text, email message, text message or any other suitable document) with, for example, an optical character recognition module 139. Excerpts can be taken from the recognized text in a manner substantially similar to that described above with respect to FIGS. 2A-6I. The applications 180 of the device may include, but are not limited to, data acquisition (e.g. image, video and sound), multimedia players (e.g. video and music players) and gaming, for example. In alternate embodiments, the system 100 can include other suitable devices, programs and applications.

While the input device 104 and output device 106 are shown as separate devices, in one embodiment, the input device 104 and output device 106 can be combined and be part of and form the user interface 102. The user interface 102 can be used to display information pertaining to content, control, inputs, objects and targets as described herein.

The display 114 of the system 100 can comprise any suitable display, such as a touch screen display, proximity screen device or graphical user interface. The type of display is not limited to any particular type or technology. In other alternate embodiments, the display may be any suitable display, such as for example a flat display 114 that is typically made of a liquid crystal display (LCD) with optional back lighting, such as a thin film transistor (TFT) matrix capable of displaying color images.

In one embodiment, the user interface of the disclosed embodiments can be implemented on or in a device that includes a touch screen display or a proximity screen device 112. In alternate embodiments, the aspects of the user interface disclosed herein could be embodied on any suitable device that will display information and allow the selection and activation of applications or system content. The terms "select", "touch" and "indicate" are generally described herein with respect to a touch screen-display. However, in alternate embodiments, the terms are intended to encompass the required user action with respect to other input devices. For example, with respect to a proximity screen device, it is not necessary for the user to make direct contact in order to select an object or other information. Thus, the above noted terms are intended to include that a user only needs to be within the proximity of the device to carry out the desired function, such as for example, selecting the text(s) to be corrected as described above.

Similarly, the scope of the intended devices is not limited to single touch or contact devices. Multi-touch devices, where contact by one or more fingers or other pointing devices can navigate on and about the screen, are also intended to be encompassed by the disclosed embodiments. Non-touch devices are also intended to be encompassed by the disclosed embodiments. Non-touch devices include, but are not limited to, devices without touch or proximity screens, where navigation on the display and menus of the various applications is performed through, for example, keys 110 of the system or through voice commands via voice recognition features of the system.

Figure 7A:
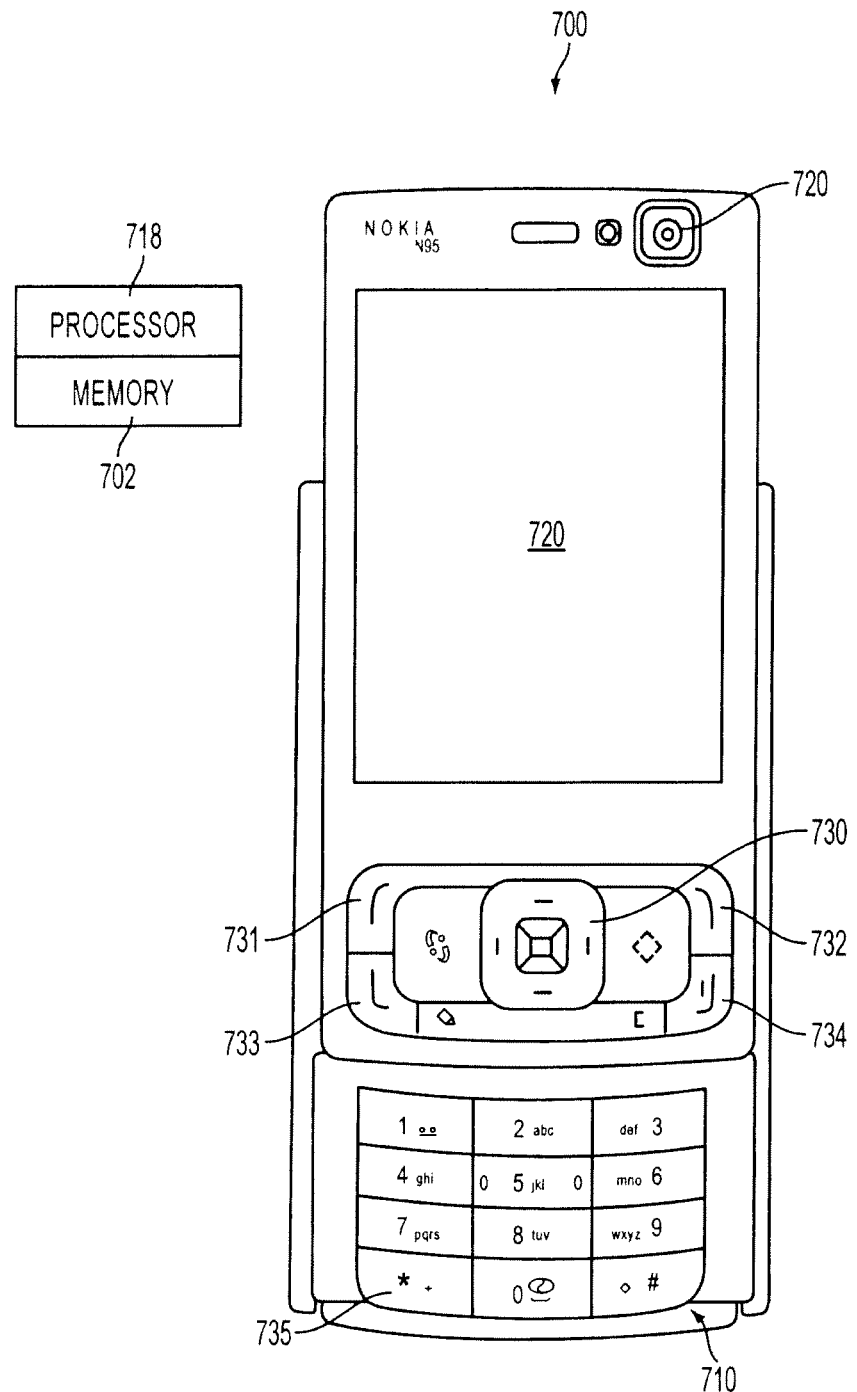
FIGS. 7A and 7B are illustrations of exemplary devices that can be used to practice aspects of the disclosed embodiments.
Figure 7B:
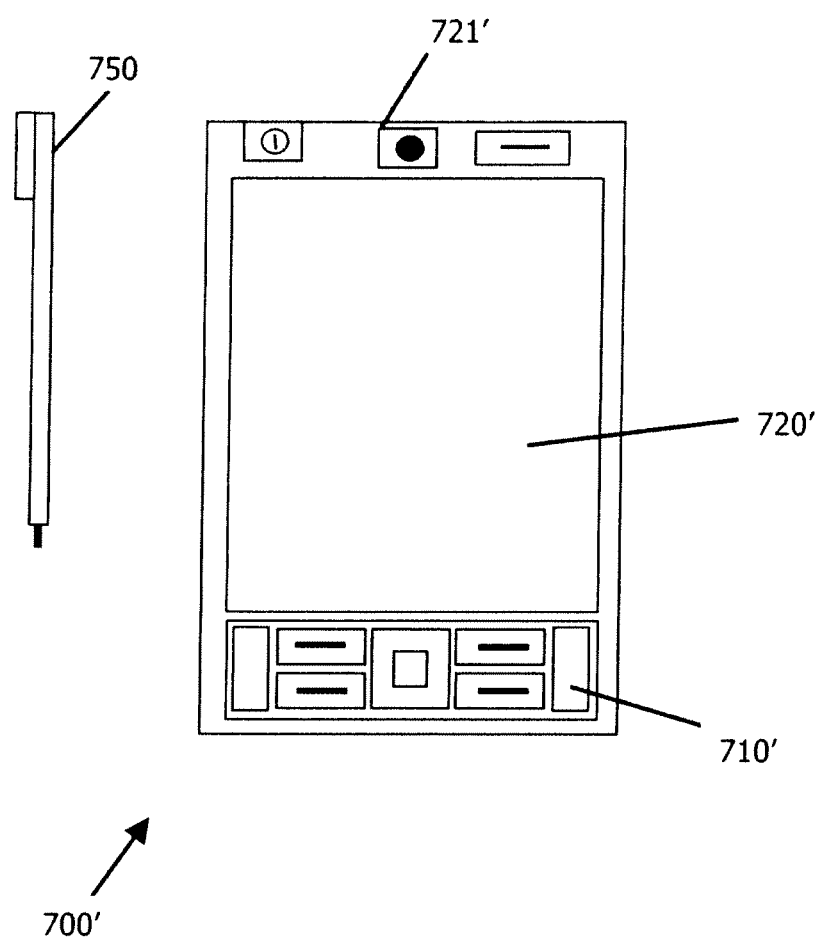

Some examples of devices on which aspects of the disclosed embodiments can be practiced are illustrated with respect to FIGS. 7A and 7B. The devices are merely exemplary and are not intended to encompass all possible devices or all aspects of devices on which the disclosed embodiments can be practiced. The aspects of the disclosed embodiments can rely on very basic capabilities of devices and their user interface. For example, in one aspect buttons or key inputs can be used for selecting the excerpted content as described above with respect to FIGS. 6A-6I.

As shown in FIG. 7A, in one embodiment, the terminal or mobile communications device 700 may have a keypad 710 as an input device and a display 720 for an output device. The keypad 710 may include any suitable user input devices such as, for example, a multi-function/scroll key 730, soft keys 731, 732, a call key 733, an end call key 734 and alphanumeric keys 735. In one embodiment, the device 700 may also include an image capture device 720 as a further input device as described above. The display 720 may be any suitable display, such as for example, a touch screen display or graphical user interface. The display may be integral to the device 700 or the display may be a peripheral display connected or coupled to the device 700. A pointing device, such as for example, a stylus, pen or simply the user's finger may be used in conjunction with the display 720 for cursor movement, menu selection and other input and commands. In alternate embodiments any suitable pointing or touch device, or other navigation control may be used. In other alternate embodiments, the display may be a conventional display. The device 700 may also include other suitable features such as, for example a loud speaker, tactile feedback devices or connectivity port. The mobile communications device may have a processor 718 connected or coupled to the display for processing user inputs and displaying information on the display 720. A memory 702 may be connected to the processor 718 for storing any suitable information, data, settings and/or applications associated with the mobile communications device 700 such as those described above.

Figure 8:
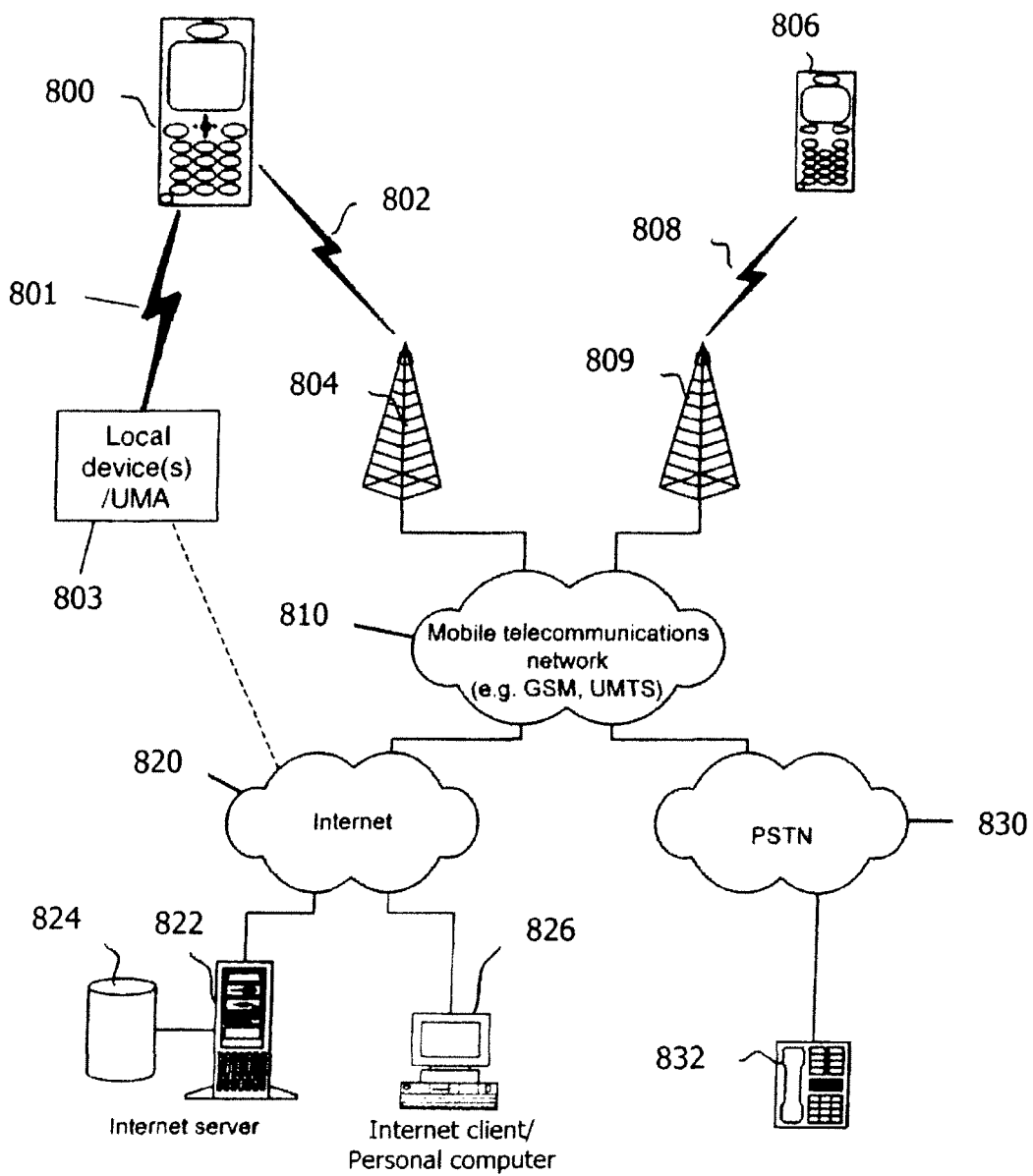
FIG. 8 illustrates a block diagram of an exemplary system incorporating features that may be used to practice aspects of the disclosed embodiments.

In the embodiment where the device 700 comprises a mobile communications device, the device can be adapted for communication in a telecommunication system, such as that shown in FIG. 8. In such a system, various telecommunications services such as cellular voice calls, worldwide web/wireless application protocol (www/wap) browsing, cellular video calls, data calls, facsimile transmissions, data transmissions, music transmissions, still image transmission, video transmissions, electronic message transmissions and electronic commerce may be performed between the mobile terminal 800 and other devices, such as another mobile terminal 806, a line telephone 832, an internet client/personal computer 826 and/or an internet server 822.

In one embodiment the system is configured to enable any one or combination of data transfer, voice communication, chat messaging, instant messaging, text messaging and/or electronic mail. It is to be noted that for different embodiments of the mobile terminal 800 and in different situations, some of the telecommunications services indicated above may or may not be available. The aspects of the disclosed embodiments are not limited to any particular set of services or applications in this respect.

The mobile terminals 800, 806 may be connected to a mobile telecommunications network 810 through radio frequency (RF) links 802, 808 via base stations 804, 809. The mobile telecommunications network 810 may be in compliance with any commercially available mobile telecommunications standard such as for example global system for mobile communications (GSM), universal mobile telecommunication system (UMTS), digital advanced mobile phone service (D-AMPS), code division multiple access 2000 (CDMA2000), wideband code division multiple access (WCDMA), wireless local area network (WLAN), freedom of mobile multimedia access (FOMA) and time division-synchronous code division multiple access (TD-SCDMA).

The mobile telecommunications network 810 may be operatively connected to a wide area network 820, which may be the Internet or a part thereof. A server, such as Internet server 822 can include data storage 824 and processing capability and is connected to the wide area network 820, as is an Internet client/personal computer 826. The server 822 may host a worldwide web/wireless application protocol server capable of serving worldwide web/wireless application protocol content to the mobile terminal 800.

A public switched telephone network (PSTN) 830 may be connected to the mobile telecommunications network 810 in a familiar manner. Various telephone terminals, including the stationary line telephone 832, may be connected to the public switched telephone network 830.

The mobile terminal 800 is also capable of communicating locally via a local link(s) 801 to one or more local devices 803. The local link(s) 801 may be any suitable type of link with a limited range, such as for example Bluetooth, a Universal Serial Bus (USB) link, a wireless Universal Serial Bus (WUSB) link, an IEEE 802.11 wireless local area network (WLAN) link, an RS-232 serial link, etc. The local devices 803 can, for example, be various sensors that can communicate measurement values or other signals to the mobile terminal 800 over the local link 801. The above examples are not intended to be limiting, and any suitable type of link may be utilized. The local devices 803 may be antennas and supporting equipment forming a wireless local area network implementing Worldwide Interoperability for Microwave Access (WiMAX, IEEE 802.16), WiFi (IEEE 802.11x) or other communication protocols. The wireless local area network may be connected to the Internet. The mobile terminal 800 may thus have multi-radio capability for connecting wirelessly using mobile communications network 810, wireless local area network or both. Communication with the mobile telecommunications network 810 may also be implemented using WiFi, Worldwide Interoperability for Microwave Access, or any other suitable protocols, and such communication may utilize unlicensed portions of the radio spectrum (e.g. unlicensed mobile access (UMA)). In one embodiment, the communications module 134 is configured to interact with, and communicate to/from, the system described with respect to FIG. 8.

Although the above embodiments are described as being implemented on and with a mobile communication device, it will be understood that the disclosed embodiments can be practiced on any suitable device incorporating a display, processor, memory and supporting software or hardware. For example, the disclosed embodiments can be implemented on various types of music, gaming and/or multimedia devices with one or more communication capabilities as described above. In one embodiment, the system 100 of FIG. 1 may be for example, a personal digital assistant (PDA) style device 700' illustrated in FIG. 7B. The personal digital assistant 700' may have a keypad 710', a touch screen display 720', camera 721' and a pointing device 750 for use on the touch screen display 720'. In still other alternate embodiments, the device may be a personal computer, a tablet computer, touch pad device, Internet tablet, a laptop computer, a mobile terminal, a cellular/mobile phone, a multimedia device, a personal communicator, a television set top box or any other suitable device capable of containing for example a display 114 shown in FIG. 1, and supported electronics such as the processor 718 and memory 702 of FIG. 7A. In one embodiment, these devices will be communication enabled over a wireless network.

The user interface 102 of FIG. 1 can also include menu systems 124 coupled to the process module 122 for allowing user input and commands such as those described herein. The process module 122 provides for the control of certain processes of the system 100 including, but not limited to the controls for content excerption as described herein. The menu system 124 can provide for the selection of different tools and application options related to the applications or programs running on the system 100 in accordance with the disclosed embodiments. The menu system 124 may also provide for configuring the speech recognition module 137, the OCR module 138 and/or excerpt application 196 as described above. In the embodiments disclosed herein, the process module 122 receives certain inputs, such as for example, signals, transmissions, instructions or commands related to the functions of the system 100. Depending on the inputs, the process module 122 interprets the commands and directs the process control 132 to execute the commands accordingly in conjunction with the other modules and/or applications, such as for example, speech recognition module 137, OCR module 138, communication module 134 and excerpt application 196. In accordance with the embodiments described herein, this can include excerpting any suitable content presented by the system 100.

Figure 9:
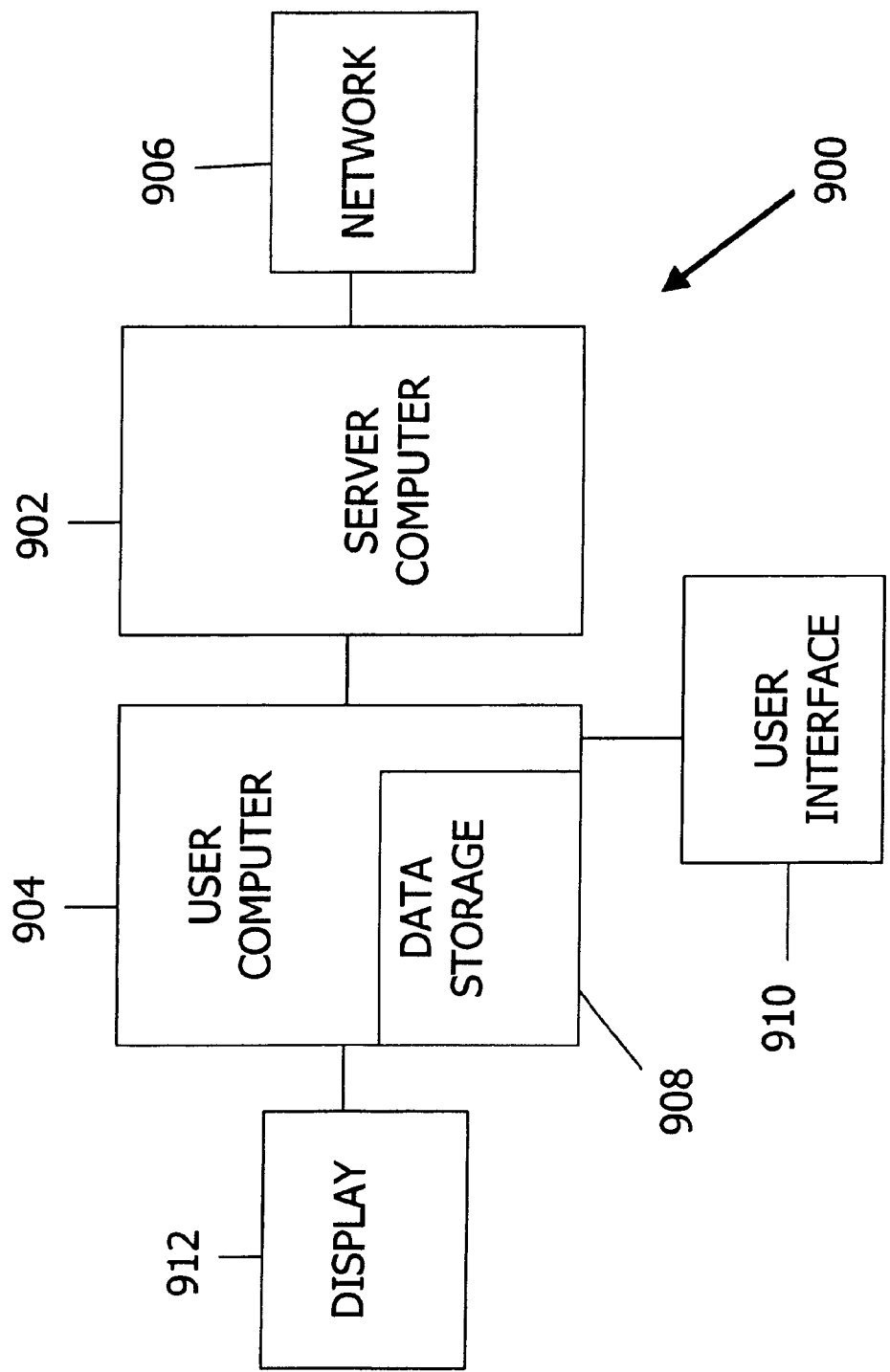
FIG. 9 is a block diagram illustrating the general architecture of an exemplary system in which the devices of FIGS. 7A and 7B may be used.

The disclosed embodiments may also include software and computer programs incorporating the process steps and instructions described above. In one embodiment, the programs incorporating the process steps described herein can be stored on and/or executed in one or more computers. FIG. 9 is a block diagram of one embodiment of a typical apparatus 900 incorporating features that may be used to practice aspects of the disclosed embodiments. The apparatus 900 can include computer readable program code means for carrying out and executing the process steps described herein. In one embodiment the computer readable program code is stored in a memory of the device. In alternate embodiments the computer readable program code can be stored in memory or a memory medium that is external to, or remote from, the apparatus 900. The memory can be directly coupled or wirelessly coupled to the apparatus 900. As shown, a computer system 902 may be linked to another computer system 904, such that the computers 902 and 904 are capable of sending information to each other and receiving information from each other. In one embodiment, computer system 902 could include a server computer adapted to communicate with a network 906. Alternatively, where only one computer system is used, such as computer 904, computer 904 will be configured to communicate with and interact with the network 906. Computer systems 902 and 904 can be linked together in any conventional manner including, for example, a modem, wireless, hard wire connection, or fiber optic link. Generally, information can be made available to both computer systems 902 and 904 using a communication protocol typically sent over a suitable communication channel. In one embodiment, the communication channel comprises a suitable broad-band communication channel. Computers 902 and 904 are generally adapted to utilize program storage devices embodying machine-readable program source code, which is adapted to cause the computers 902 and 904 to perform the method steps and processes disclosed herein. The program storage devices incorporating aspects of the disclosed embodiments may be devised, made and used as a component of a machine utilizing optics, magnetic properties and/or electronics to perform the procedures and methods disclosed herein. In alternate embodiments, the program storage devices may include magnetic media, such as a diskette, disk, memory stick or computer hard drive, which is readable and executable by a computer. In other alternate embodiments, the program storage devices could include optical disks, read-only-memory ("ROM") floppy disks, memory sticks, flash memory devices and other semiconductor devices, materials and chips.

Computer systems 902 and 904 may also include one or more microprocessors for executing stored programs. Computer 902 may include a data storage device 908 on its program storage device for the storage of information and data. The computer program or software incorporating the processes and method steps incorporating aspects of the disclosed embodiments may be stored in one or more computers 902 and 904 on an otherwise conventional program storage device. In one embodiment, computers 902 and 904 may include a user interface 910, and/or a display interface 912 from which aspects of the disclosed embodiments can be accessed. The user interface 910 and the display interface 912, which in one embodiment can comprise a single interface, can be adapted to allow the input of queries and commands to the system, as well as present the results of the commands and queries, as described with reference to FIGS. 2A through 6I for example.

The aspects of the disclosed embodiments are directed to improving how excerpts are made to content displayed in a device. Excerpted content is selected through speech recognition for excerption. The excerpted content is transferred to a predetermined location or application while providing a link back to the source of the excerpted content. A user of a mobile device can easily create and organize excerpted content, as well as view the source of that content.

It is noted that the embodiments described herein can be used individually or in any combination thereof. It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

What is claimed is:

1. A method comprising:
   displaying content from which excerpts may be extracted on a display of a device;
   collecting a speech recognition vocabulary set wherein the speech recognition vocabulary set corresponds to only content visible on the display such that at least one vocabulary word in the speech recognition vocabulary set is the same as a word presented on the display;
   extracting speech recognition grammar rules or statistical models from the displayed content;
   receiving a speech input designating a segment of the content to be excerpted;
   recognizing the speech input according to the speech recognition grammar rules or statistical models;
   transferring the excerpted content to a predetermined location for storage and retrieval;
   providing an organizer for categorizing the excerpted content at the predetermined location; and
   creating a link to a source of the excerpted content and displaying the link with the excerpted content.

2. The method of claim 1, where the speech input comprises at least a first word in the segment to be excerpted and at least a last word in the segment to be excerpted.

3. The method of claim 1, wherein the speech recognition vocabulary set is updated as a content of the display changes.

4. The method of claim 1, further comprising optically recognizing characters presented on the display for enabling designation of one or more recognized characters through speech recognition.

5. The method of claim 1, wherein the speech input corresponds to predetermined commands for designating the content to be excerpted.

6. The method of claim 5, wherein the predetermined commands include "first line", "first paragraph", "whole screen", "next page", "current page", "last line", "reset the beginning word" and/or "reset the ending word".

7. The method of claim 1, wherein extracting the speech recognition grammar rules or statistical models occurs within the device or external to the device.

8. A computer program product stored in a memory comprising computer readable program code embodied in a computer readable medium for:
   displaying content from which excerpts may be extracted on a display of a device;
   collecting a speech recognition vocabulary set wherein the speech recognition vocabulary set corresponds to only content visible on the display such that at least one vocabulary word in the speech recognition vocabulary set is the same as a word presented on the display;

extracting speech recognition grammar rules or statistical models from the displayed content;
receiving a speech input designating a segment of the content to be excerpted; and
recognizing the speech input according to the speech recognition grammar rules or statistical models;
transferring the excerpted content to a predetermined location for storage and retrieval;
providing an organizer for categorizing the excerpted content at the predetermined location; and
creating a link to a source of the excerpted content and displaying the link with the excerpted content.

9. The computer program product of claim 8 wherein the computer readable program code is stored in a memory of a mobile communications device.

10. A system comprising:
a remote server; and
a portable communication device including
    a display configured to present predetermined content from which excerpts may be extracted, and
    a processor configured to:
        request the predetermined content from the remote server;
        collect a speech recognition vocabulary set wherein the speech recognition vocabulary set corresponds to only content visible on the display such that at least one vocabulary word in the speech recognition vocabulary set is the same as a word presented on the display;
        extract speech recognition grammar rules or statistical models from the displayed content;
        recognize a speech input according to the speech recognition grammar rules or statistical models for designating a segment of the content to be excerpted;
        transfer the excerpted content to a predetermined location for storage and retrieval;
        provide an organizer for categorizing the excerpted content at the predetermined location; and
        create a link to a source of the excerpted content and displaying the link with the excerpted content.

11. The system of claim 10, where the speech input comprises at least a first word in the segment to be excerpted and at least a last word in the segment to be excerpted.

12. The system of claim 10, wherein the processor is further configured to update the speech recognition vocabulary set as a content of the display changes.

13. The system of claim 10, further comprising an optical character recognition module configured to optically recognizing characters presented on the display for enabling designation of one or more recognized characters for excertion through speech recognition.

14. The system of claim 10, wherein the remote server is a proxy server configured to extract speech recognition grammar rules or statistical models from content requested by the processor.

15. An apparatus comprising:
at least one input device configured to receive a speech input;
a display configured to present predetermined content acquired by the apparatus from which excerpts may be extracted; and
a processor configured to:
    collect a speech recognition vocabulary set wherein the speech recognition vocabulary set corresponds to only content visible on the display such that at least one vocabulary word in the speech recognition vocabulary set is the same as a word presented on the display;
    extract speech recognition grammar rules or statistical models from the presented content;
    recognize the speech input according to the speech recognition grammar rules or statistical models for designating a segment of the content to be excerpted;
    transfer the excerpted content to a predetermined location for storage and retrieval;
    provide an organizer for categorizing the excerpted content at the predetermined location; and
    create a link to a source of the excerpted content and displaying the link with the excerpted content.

16. The apparatus of claim 15, where the speech input comprises at least a first word in the segment to be excerpted and at least a last word in the segment to be excerpted.

17. The apparatus of claim 15, wherein the processor is further configured to present on the display an excerpt organizer, the excerpt organizer including at least one excerpt content and at least a source of the excerpt content.

18. The apparatus of claim 15, wherein the at least one input device further includes an imaging device configured to optically recognize characters for enabling the designation of excerpt content through speech recognition.

19. The apparatus of claim 15, wherein the processor is further configured to cause a presentation of excerpt selections on the display, the excerpt selections being configured to enable designation of at least a portion of the content to be excerpted through speech recognition.

20. The apparatus of claim 15, wherein the apparatus is a mobile communication device.

21. A user interface comprising:
at least one input device configured to receive a speech input;
a display configured to present predetermined content acquired by the apparatus from which excerpts may be extracted; and
a processor configured to:
    collect a speech recognition vocabulary set wherein the speech recognition vocabulary set corresponds to only content visible on the display such that at least one vocabulary word in the speech recognition vocabulary set is the same as a word presented on the display;
    extract speech recognition grammar rules or statistical models from the presented content;
    recognize the speech input according to the speech recognition grammar rules or statistical models for designating a segment of the content to be excerpted;
    transfer the excerpted content to a predetermined location for storage and retrieval;
    provide an organizer for categorizing the excerpted content at the predetermined location; and
    create a link to a source of the excerpted content and displaying the link with the excerpted content.

22. The user interface of claim 21, wherein the organizer displays the excerpt content and at least the source of the excerpt content.

23. The user interface of claim 21, wherein the at least one input device further includes an imaging device configured to optically recognize characters for enabling the designation of excerpt content through speech recognition.

24. The user interface of claim 21, wherein the processor is further configured to cause a presentation of excerpt selections on the display, the excerpt selections being configured to enable designation of at least a portion of the excerpt content through speech recognition.

* * * * *